Feb. 19, 1952 E. R. GASSER ET AL 2,586,157
VIBRATION DEGENERATING DEVICE
Filed March 15, 1947 2 SHEETS—SHEET 1
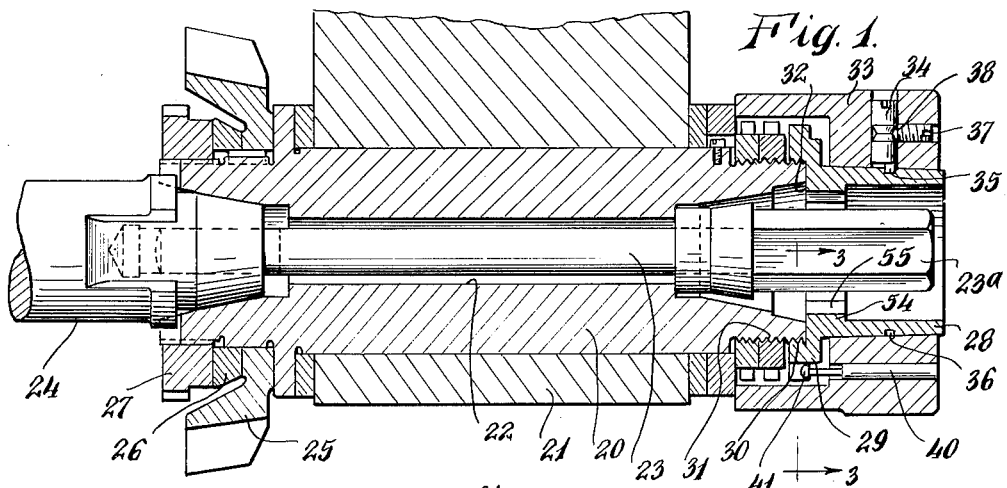
INVENTORS
Emil R. Gasser
BY Gustave H. Hedman
Fraser, Myers & Mawley
ATTORNEYS.

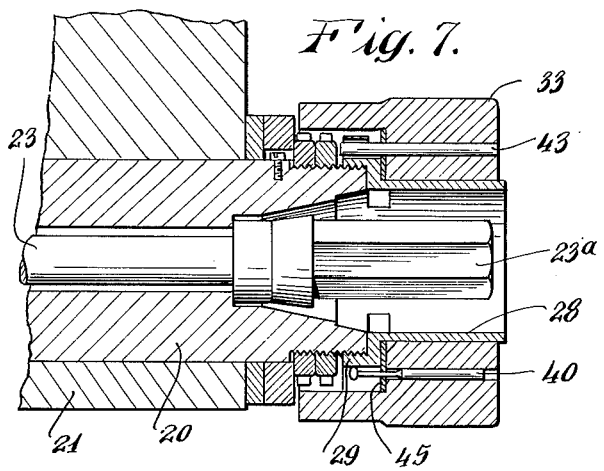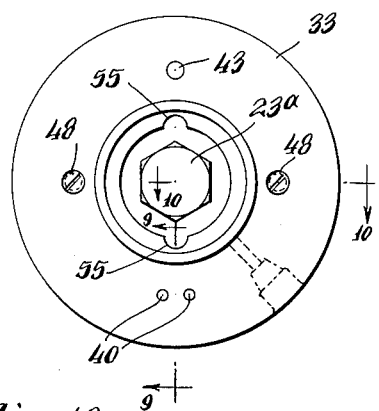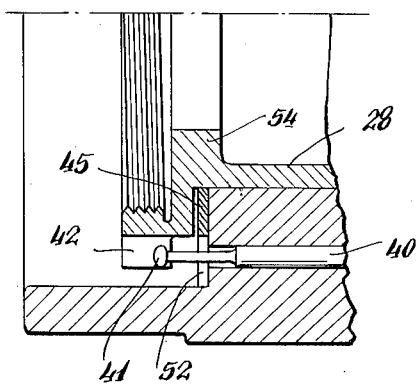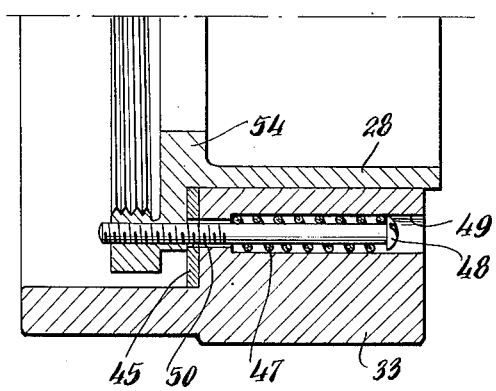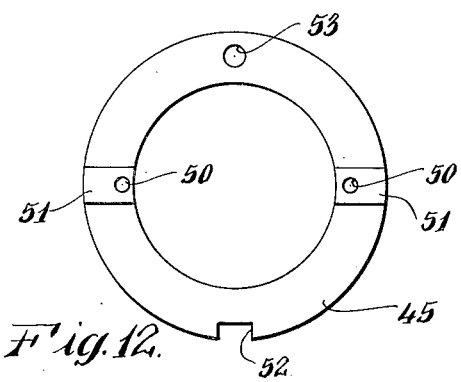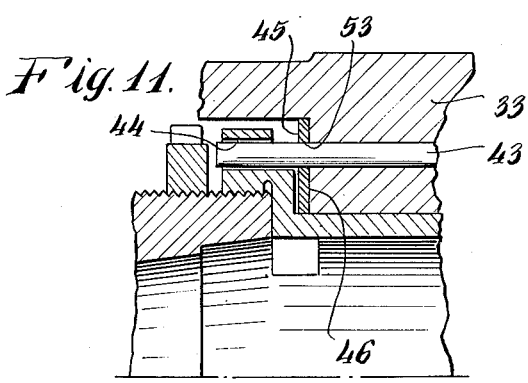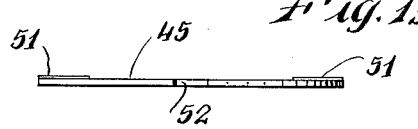
INVENTORS.
Emil R. Gasser
Gustave H. Hedman
BY
ATTORNEYS.

Patented Feb. 19, 1952

2,586,157

UNITED STATES PATENT OFFICE 2,586,157

VIBRATION DEGENERATING DEVICE

Emil R. Gasser, Buffalo, and Gustave H. Hedman, Kenmore, N. Y., assignors to Farrel-Birmingham Company, Inc., Buffalo, N. Y., a corporation of Connecticut Application March 15, 1947, Serial No. 735,042

11 Claims. (Cl. 90—11)

The present invention relates to what we term a vibration degenerating device for eliminating chattering on machine tool spindles, for example the cutter spindles of gear generators, relatively long boring spindles, milling machine spindles and the like.

Vibration dampers or absorbers of various types are known and have been used to reduce the vibration of a machine or part of a machine which is excited by an external forced vibration at a known frequency. In the conventional types of vibration absorbers, whether they be for torsional or translational vibration, the disturbing force is a function of time and remains constant irrespective of the amplitude of vibration. Because of this, a finite vibration amplitude becomes established when the exciting energy and the absorbing energy are equal. Expressed differently, the vibration experienced without an absorber will be reduced to a smaller amplitude by the addition of an absorber. The amount of reduction of vibration obtainable can be controlled by the proportioning of the damper relative to the main system. However, this reduction will then remain constant with the result that the final amplitude of vibration remains proportional to the exciting force.

In contradistinction to conventionally known vibration absorbers, our so-called vibration degenerator is employed in cases where there is an exciting force which originates at the cutting edge of a cutter on a spindle and which exciting force is a function of the vibration amplitude. In other words, the energy that is supplied to sustain vibration of the cutter spindle is dependent upon the amplitude of the vibration itself. The relationship between the exciting force and the amplitude is most difficult of ascertainment since it is dependent upon such other factors as the cutting angles of the cutter, the material being cut, the cutter tool sharpness, the cutting speed, and the mass of the work being acted upon. However, by establishing an energy absorption characteristic of the degenerating device, such that for any given amplitude or vibration the input energy from the cutter is less than the absorbed energy of the degenerating device, it becomes obvious that a vibration cannot be built up and that any vibration due to a disturbance will degenerate to zero in the ideal case.

It is accordingly an object of the present invention to provide a vibration degenerating device which, when attached to a spindle of a main vibrating system, will function to degenerate and nullify the build up of self-excited vibrations. A more specific object is to provide a device which will eliminate the chattering on the cutter spindle of a gear generator and other machines having long spindles or shafts. An additional specific object is to provide a vibration degenerating device which, when applied to the spindle of a gear generator, will not have to be removed therefrom and will not interfere with the accessibility to the removable bolt which couples the connecting shaft and the cutter spindle together when removal of the cutter for re-sharpening, replacement, etc., has to be made.

The foregoing and other objects of our invention not specifically enumerated are accomplished by mounting an inertia mass on a spindle in substantially coaxial relation thereto and providing means for adjustably varying the resistance to rotation of the mass relatively to the spindle as will be better understood from the detailed description which follows, when considered in connection with the accompanying drawings, wherein there are shown two embodiments of the invention.

In the drawings:

Figure 1 shows an axial section through the outer cutter spindle of a gear generating machine with the present invention applied thereto.

Fig. 2 is an end elevation of the device shown in Fig. 1 as viewed from the right hand end thereof.

Fig. 3 is an enlarged fractional sectional view taken substantially along the plane of the line 3—3 of Fig. 1.

Fig. 4 is a sectional view taken substantially along the plane of the line 4—4 of Fig. 3.

Figs. 5 and 6 show sectional views taken substantially along the planes of the lines 5—5 and 6—6, respectively, of Fig. 2.

Fig. 7 is a view similar to Fig. 1 showing a modified form of the invention.

Fig. 8 is an end elevation of the device shown in Fig. 7, as viewed from the right hand end thereof.

Figs. 9 and 10 show enlarged sectional views taken substantially along the planes of the lines 9—9 and 10—10, respectively, of Fig. 8.

Fig. 11 is a sectional view on an enlarged scale of a detail of the invention shown in Fig. 7.

Fig. 12 is a plan view of the friction ring plate shown in Figs. 7 to 11.

Fig. 13 is a front elevation of the friction ring plate shown in Fig. 12.

Referring first to Figs. 1–6 of the drawings, the invention is shown as applied to the outer cutter spindle of a gear generating machine of the general type disclosed in the patent to Sykes, No. 2,010,970, August 13, 1935. As herein shown, the outer cutter spindle 20 is mounted within a cutter head bearing 21 in the usual manner, the cutter spindle having a bore 22 through which extends a securing bolt 23 adapted for coupling the spindle to the shaft 24 through which the spindle is given oscillatory, rotary and translational movements. Detachably mounted on the left hand end of the spindle 20 for movement therewith is a helical gear shaper cutter 25 which is held in position on said spindle by a spacing washer 26 and securing nut 27. The arrangement of the parts thus far described is such that, by rotating the head 23a of the bolt with a suitable wrench the bolt can be disconnected from the shaft, the latter can be withdrawn from engagement with the spindle and then, by removing the securing nut 27 and spacing washer 26, the cutter may be removed for resharpening or replacement by another cutter.

The vibration degenerating device of our present invention is herein shown as mounted on the right hand end of the spindle 20 and comprises a sleeve 28, one end of which is formed with a flange 29, which latter is undercut and screw-threaded as at 30 for engagement with the screw-threads 31 formed on the spindle. Preferably the screw-threaded engagement between the sleeve and the spindle is such as to provide a butt joint between a shoulder 32 on the sleeve with the end face of the spindle. Rotatably mounted on the external surface of the sleeve 28 is an inertia mass 33 which should have a moment of inertia equal to at least the sum of the moments of inertia of the cutter spindle 20, the cutter 25 and the connecting shaft 24 so as to have a sufficiently strong degenerating action upon the self-excited vibrations set up in the spindle when the cutter is taking a cut from a blank (not shown) being acted upon. The response characteristic of the present device in order to be effective must be very broad and cover, for example, a frequency range of from 300 cycles per second down to practically zero cycles per second, and this is accomplished by establishing the proper relationship between the rotary inertias of the main vibratory system and the degenerating system, so that the energy absorption capacity of the degenerator outweighs, in a sense, the energy excitation originating at the cutting edge of the cutter. To obtain this strong degenerating action the mass 33 is mounted on the sleeve 28 so that axial relative movement between the mass and the sleeve will produce a change in radial clearance between these parts. To accomplish this change in radial clearance the exterior surface of the sleeve 28 and the internal surface of the mass 33 are complementally tapered and the clearance between said tapered surfaces is obtained by rotatable adjustment of a pin 34 radially mounted in the mass 33, said pin having at its inner end a small eccentrically disposed nose 35, which engages in an annular groove 36 in the sleeve so that rotation of the pin 34 will shift the mass 33 axially relatively to the sleeve 28. After the best adjustment has been obtained, the pin 34 is locked in position by a set screw 37 engaging in an annular groove 38 in the pin. To secure damping, the clearance space between the sleeve and the mass is, before assembly, filled with a heavy viscous liquid which may be injected into the space between said parts through a conventional fitting 39, which liquid will then give viscous damping when any relative rotary motion takes place between the sleeve and the mass.

The arrangement thus far described does not incorporate any torsional resiliency and notwithstanding this, a satisfactory degenerating action leaving but a trace of chatter in the system was obtained while cutting gears. We found, however, that this trace of chatter could also be eliminated by incorporating torsional resiliency, which is accomplished by mounting in the mass 33 two axially disposed spring pins 40, the inner ends of which are reduced in diameter and formed with enlarged ball ends 41 which engage in a slot or recess 42 formed in the flange 29 of the sleeve 28. The spacing of the pins 40 is preferably such that when pushed into the recess 42 a slight pressure will be exerted on each of the pins so as to direct them toward each other. This pre-loading of the pins does not affect the resilient characteristic of the inertia mass but is simply done to eliminate the possibility of backlash between the mass 33 and the sleeve 28. Hence, when relative rotation between the mass 33 and the sleeve 28 is forced, the spring pins will bend, and due to this bending a fixed resiliency, depending on the size of the pins, is established. To definitely limit the amount of the angular rotation of the mass 33 relative to the sleeve 28 and thereby limit the amount of bending stress on the spring pins 40, there is incorporated in the mass 33 a fixed pin 43, the inner end of which extends into a hole 44 in the flange 29 of the sleeve, the hole being of slightly larger diameter than the end of the pin engaging therein. In view of this latter pin and hole arrangement, the mass 33 is effectively free to oscillate on sleeve 28 within the fixed limits provided by the hole 44. The primary object for this limiting pin 43 is to prevent breakage of the spring pins 40 when removing and mounting the cutters, at which time considerable heavy jarring takes place when the cutter nut is loosened or tightened with a wrench and hammer.

In the modification of our invention shown in Figs. 7–13, the degenerating unit instead of working on the principle of viscous damping, operates on what we call a "boundary friction" to secure the damping effect. Essentially in this modification, as in the one previously described, the degenerating device consists of a sleeve 28 and an inertia mass 33 with this difference, namely, that the bore in the inertia mass and the complemental surface of the sleeve are cylindrical instead of tapered. The friction is derived from a ring plate 45 which is held between the flange 29 on the sleeve 28 and a shoulder 46 on the mass 33 by two helical springs 47, the tension of which is adjustable by screws 48 symmetrically disposed in axial openings 49 in the mass 33 and screw-threadedly engaging in the sleeve 28, the screws passing through openings 50 in the ring plate. By experimentation we have determined that the friction surfaces must be small so that a relatively high unit pressure is created due to the force of the springs 47. Such small frictional surfaces are provided by forming on ring plate 45 small thickened portions 51 through which pass the tensioning screws 48. This high unit pressure is essential so that the boundary lubricating conditions between the friction surfaces of the ring plate and the flange 29 of the sleeve are brought about. For example, with a large frictional surface, the oil that is used for lubricating the device will tend to maintain a definite oil film with a consequent small coefficient of friction. To make the device operate correctly, however, a large frictional effect is required, quite similar to that which has been pointed out in connection with the viscous degenerating unit where the use of a very heavy viscous fluid is required.

In the embodiment of the invention shown in Figs. 8 to 13 no axial adjustment between the mass 33 and the sleeve 28 is necessary but, as in the first embodiment hereinbefore described, it is desirable to pre-load the inertia mass with spring pins such as 40 and to provide for such pin engagement in the recess 42, the ring plate 45 is formed with a clearance recess 52. Likewise, for limiting the angular rotation of the inertia mass relatively to the sleeve a pin 43 carried by the mass 33 has its end engaging in a hole 44 in the flange of the sleeve, there being an opening 53 in the ring plate 45 to accommodate said pin.

From the detailed description of the two embodiments of our invention hereinbefore described, it will be noted that the sleeve has an internal dimension sufficiently large to permit access to the securing bolt 23 and thereby obviate the necessity of disturbing the mounting of the spindle within its cutter head bearing when it is desired to change or remove a cutter from the spindle. To facilitate mounting the sleeve 28 on the spindle, the sleeve is formed with an internal flange 54 provided with diametrically disposed recesses 55 for accommodating a suitable wrench.

Although we have shown and described our vibration degenerating device in the form of a removable unit applied to the outer spindle of a helical gear generating machine, it will be apparent to those skilled in the art that the device will be equally well adaptable for use in overcoming chattering on relatively long boring spindles, milling machine spindles and long spindles on analogous machines.

Although we have shown and described two embodiments of our invention it will be apparent that changes in the specific constructional details thereof may be resorted to within the range of engineering skill without departing from the spirit of our invention as defined in the appended claims.

What we claim is:

1. A device for degenerating self-excited vibrations set up in a spindle or shaft by a cutting tool carried thereby, comprising in combination, an inertia mass mounted on and in substantially coaxial relation to said spindle, a viscous lubricating substance between the inertia mass and the spindle for providing limited frictional resistance to rotation therebetween, and means for adjustably varying the viscous frictional resistance to rotation of the mass relatively to the spindle.

2. A device for degenerating self-excited vibrations set up in a spindle or shaft by a cutting tool carried thereby, comprising in combination, an inertia mass movably mounted on and in substantially coaxial relation to said spindle, a viscous lubricating substance between the inertia mass and the spindle for providing limited frictional resistance to rotation therebetween, and means for adjustably varying the resistance to rotation of the mass relatively to the spindle by movement of the mass axially relatively to the spindle.

3. A device for degenerating self-excited vibrations set up in a spindle or shaft by a cutting tool carried thereby, comprising in combination, a sleeve for attachment to the spindle for rotation therewith, an inertia mass movably mounted on and in substantially coaxial relation to said sleeve for frictional rotation therewith, and means for adjustably varying the resistance to rotation of the mass relatively to the sleeve by movement of the mass axially relatively to the sleeve comprising a radically mounted pin having an eccentric nose mounted in one of said members and extending into an annular groove in the other of said members, rotation of said pin operating to shift the inertia mass relatively to the sleeve.

4. A device according to claim 2 wherein the sleeve and mass have complementally tapered surfaces.

5. A device according to claim 3 wherein a viscous lubricating substance is disposed between the mass and the sleeve, rotation of said pin operating to shift the mass axially relatively to the sleeve.

6. A device for degenerating self-excited vibrations set up in a spindle or shaft by a cutting tool carried thereby, comprising in combination, an inertia mass mounted on and in substantially coaxial relation to said spindle for frictional rotation therewith, means for adjustably varying the resistance to rotation of the mass relatively to the spindle, and means for preventing free rotation of the mass relatively to the spindle comprising spring pins carried by one of said last two mentioned members and extending axially of the unit, the inner ends of said pins engaging in a recess in the other of said members and being tensioned against the walls of said recess.

7. In combination with a spindle of a gear generating machine having a cutter mounted on one end of the spindle, a driving connecting shaft in axial alignment with the spindle, a bolt having a shank extending through the spindle and coupling the connecting shaft to the spindle, with the head of said bolt being accessible from the outer end of the spindle, an inertia mass adjustably attached to the last mentioned end of the spindle for limited rotation relatively thereto for degenering self-excited vibrations set up in the spindle by the cutter, and said inertia mass having an axial opening through which access can be had to the bolt.

8. In combination with a spindle of a gear generating machine having a cutter mounted on one end of the spindle, a connecting shaft in axial alignment with the spindle, a bolt having a shank extending through the spindle and coupling the connecting shaft to the spindle, with the head of said bolt being accessible from the other end of the spindle, a device for degenerating self-excited vibrations set up in the spindle by the cutter comprising a sleeve attached to the last mentioned end of the spindle and through which sleeve access can be had to the bolt, and an inertia mass adjustably mounted for limited rotation on said sleeve.

9. The combination as set forth in claim 8 wherein the sleeve projects axially beyond the end of the spindle and has a shoulder which abuts against the end of the spindle.

10. The combination as set forth in claim 8 wherein means are provided for adjustably varying the resistance to rotation of the mass relatively to the sleeve.

11. A device for degenerating self-excited vibrations set up in a spindle or shaft by a cutting tool carried thereby, comprising in combination, an inertia mass mounted on and in substantially coaxial relation to the spindle for frictional rotation therewith, means for adjustably varying the resistance to rotation of the mass relatively to the spindle, means for preventing free rotation of the mass relatively to the spindle comprising spring pins carried by one of said last two mentioned members and extending axially of the unit, the inner ends of said pins engaging in a recess in the other of said members and being tensioned against the walls of said recess, and means for definitely limiting the amount of angular rotation of the inertia mass relatively to the spindle and thereby limiting the amount of bending stress on the spring pins consisting of a rigid pin extending axially of the unit carried by one of said members and engaging in an opening of somewhat larger diameter than said last-mentioned pin formed in the other member.

EMIL R. GASSER.
GUSTAVE H. HEDMAN.

REFERENCES CITED

The following references are of record in the file of this patent:

UNITED STATES PATENTS

| Number | Name | Date |
| --- | --- | --- |
| 1,465,024 | Regenbogen et al. | Aug. 14, 1923 |
| 1,758,274 | Butenkoff | May 13, 1930 |
| 1,820,749 | Loeffler | Aug. 25, 1931 |
| 1,901,853 | Warner | Mar. 14, 1933 |
| 2,051,954 | Leland | Aug. 25, 1936 |
| 2,411,550 | Lynn et al. | Nov. 26, 1946 |